United States Patent [19]

Pierce

[11] 4,257,846
[45] Mar. 24, 1981

[54] BI-BRAYTON POWER GENERATION WITH A GAS-COOLED NUCLEAR REACTOR

[75] Inventor: Bill L. Pierce, Whitehall, Pa.

[73] Assignee: Westinghouse Electric Corp., Pittsburgh, Pa.

[21] Appl. No.: 870,893

[22] Filed: Jan. 19, 1978

[51] Int. Cl.² ............................................. G21C 15/22
[52] U.S. Cl. ...................................................... 176/60
[58] Field of Search ...................... 176/60, 65; 60/644, 60/655

[56] References Cited

U.S. PATENT DOCUMENTS

| 3,043,763 | 7/1962 | Spillmann | 176/60 |
| 3,218,802 | 11/1965 | Sawle | 176/65 |
| 3,410,091 | 11/1968 | Frutschi | 176/60 |
| 3,444,401 | 5/1969 | Gilli | 176/39 |
| 3,851,474 | 12/1974 | Heller et al. | 60/644 |
| 3,974,029 | 8/1976 | George et al. | 176/65 |
| 4,000,617 | 1/1977 | Fortescue | 60/644 |

FOREIGN PATENT DOCUMENTS

| 1902259 | 9/1969 | Fed. Rep. of Germany | 60/655 |
| 2252077 | 5/1973 | Fed. Rep. of Germany | 60/655 |
| 342798 | 7/1955 | Switzerland | 176/60 |
| 897009 | 5/1962 | United Kingdom | 176/65 |
| 1204119 | 9/1970 | United Kingdom | 60/655 |

*Primary Examiner*—Charles T. Jordan
*Assistant Examiner*—S. A. Cangialosi
*Attorney, Agent, or Firm*—Edward L. Levine; Z. L. Dermer

[57] ABSTRACT

Method and apparatus for generating power from a high temperature gas-cooled nuclear reactor utilizing two Brayton-type thermal cycle circuits exchanging heat through a common heat exchanger. The reactor gas coolant is circulated through a primary circuit including the reactor, and a working fluid is circulated through a secondary circuit in heat exchange relation with the reactor gas coolant. Work is extracted from the primary circuit turbine to drive both the primary circuit and secondary circuit compressors. Further, the entire primary circuit and the secondary circuit compressor are preferably disposed within a singular containment structure.

2 Claims, 4 Drawing Figures

BI-BRAYTON POWER GENERATION WITH A GAS-COOLED NUCLEAR REACTOR

BACKGROUND OF THE INVENTION

1. Field of the Invention

This invention relates to high temperature gas-cooled nuclear reactors, and more particularly to thermal power cycles for generating useful power from such reactors. The invention is applicable to mobile as well as stationary plants.

2. Description of the Prior Art

Safety considerations relating to the use of high temperature gas-cooled nuclear reactors typically dictate that the power conversion system be either located within a sealed containment vessel, or located outside of the containment and include a heat exchanger within the containment to transfer heat energy from the reactor to the secondary power conversion system. This is particularly true with respect to mobile reactor usage such as in seagoing vessels and contemplated land and air transport systems.

Disposition of the power conversion system, typically including a turbine and compressor, within the containment undesirably increases the containment size, weight and cost over that required for the reactor primary system alone. The power output must then be transferred through the containment such as by a mechanical shaft and a sealed containment penetration or by location of an electrical generator within the containment and the passage of electrical leads through the sealed containment. Containment penetrations through which large quentities of energy are transferred are difficult to design and accordingly costly.

In systems where a heat exchanger is the physical barrier between the primary reactor gas coolant and the secondary working fluid, for an efficient conversion the heat exchanger must operate at temperatures close to the reactor outlet temperature. Such high temperatures at the heat exchanger induce material, design and fabrication concerns such that in many applications either of the typical arrangements are undesirable. For example, in power plants for mobile application it is often necessary to transmit the reactor energy to thermal engines which are remotely located with respect to the reactor and which therefore tend toward the utilization of the heat exchanger arrangement. This arrangement is then complicated by the associated thermal concerns.

It is therefore desirable to provide an arrangement which utilizes the high temperature capabilities of gas-cooled reactors while alleviating these concerns.

SUMMARY OF THE INVENTION

This invention provides arrangements compatible with high temperature gas-cooled reactors which alleviate the discussed concerns. In one embodiment the invention includes two Brayton-type circuits exchanging heat energy through a common heat exchanger. In the reactor primary circuit the gas coolant is serially circulated through the reactor, a primary turbine, the heat exchanger, a primary compressor and returned to the reactor. In the secondary circuit a working fluid is serially circulated through the heat exchanger, in heat exchange relation with the primary circuit, a power turbine, a precooler, a secondary compressor and returned to the heat exchanger. To lessen the peak temperature at which the heat exchanger must operate while maintaining an efficient process, work is extracted from the primary turbine to drive both the primary circuit compressor as well as the secondary circuit compressor. This can be accomplished by a common mechanical shaft connection. Extraction work from the primary circuit turbine to drive the secondary circuit compressor upstream of the common heat exchanger lowers the thermal conditions of the primary fluid entering the heat exchanger.

As a consequence of lowering the peak temperature of primary coolant entering the heat exchanger the thermal conditions of the working fluid exiting the heat exchanger are less severe. Accordingly, where the heat exchanger is located within the containment and the power conversion system outside the containment, the secondary circuit conduits passing through the containment transport fluid at lower thermal conditions. Containment penetration design limitations are accordingly reduced.

Further, with such an arrangement the entire primary system together with the compressor of the secondary system can advantageously be disposed within the containment structure without unduly increasing the containment size. The power turbine of the secondary system remains outside the containment. The inventive system also is compatible with other modifications to increase overall efficiency, such as the use of a primary system precooler to cool the gas coolant prior to its entrance into the primary compressor.

The inventive arrangements accordingly provide for efficient utilization of high temperature gas-cooled reactor capabilities through use of two Brayton cycles, less severe heat exchanger design and operating conditions and smaller and simpler containments and containment penetrations.

BRIEF DESCRIPTION OF THE DRAWINGS

The advantages, nature and additional features of the invention will become more apparent from the following description, taken in connection with the accompanying drawings in which:

Referring now to FIG. 1 there is shown one arrangement for utilization of a high temperature gas-cooled nuclear reactor 10 in accordance with the invention. Nuclear reactors referred to as "high temperature" typically provide coolant at temperatures in excess of 1400° F. The reactor can be of many designs, well known in the art, and includes a nuclear core 12 which generates and transfers energy to a gas coolant circulated through the core 12 and a vessel 14 housing the core. Many gases are suitable for use with high temperature gas reactor technology and preferably inert gases, such as helium, are utilized. Shown surrounding the reactor vessel 14 is a radiation shield 16 which serves as a neutron and gamma barrier.

Figure 1:
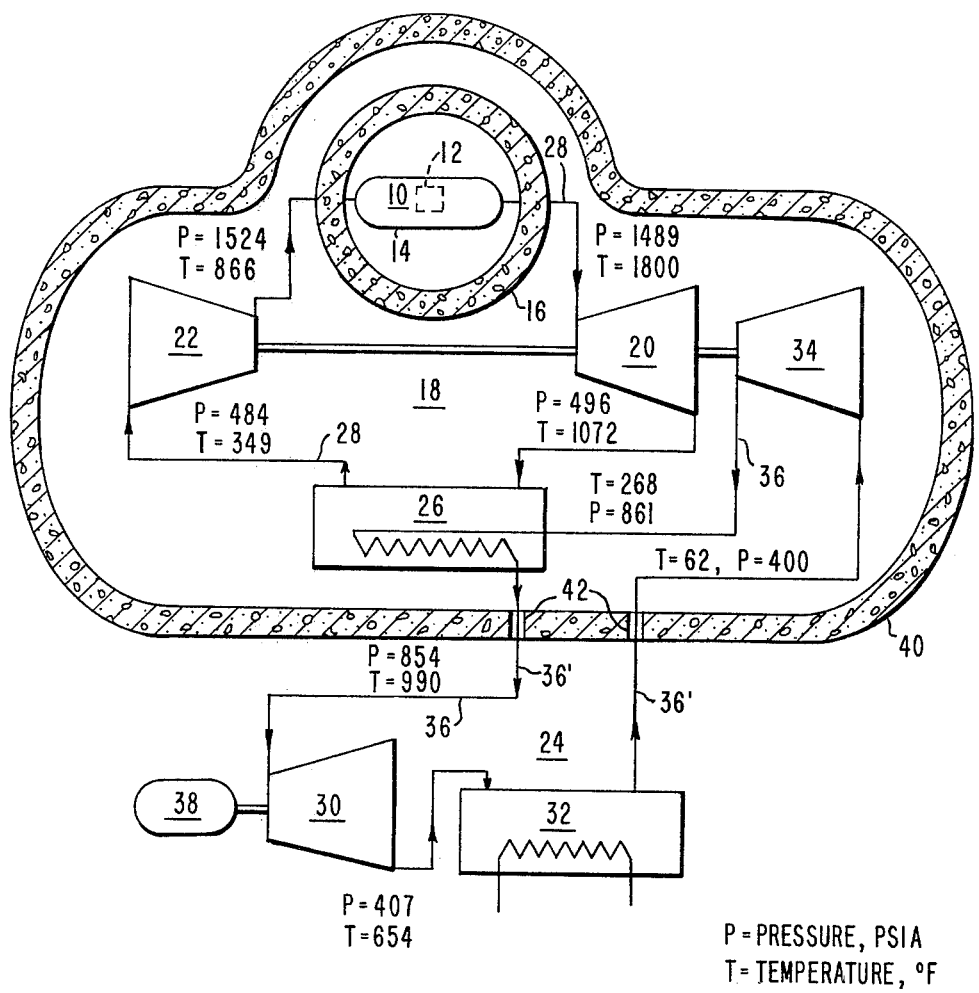
FIG. 1 is a schematic representation of a high temperature gas-cooled nuclear reactor system arrangement in accordance with this invention.

The primary reactor circuit 18 includes an expansion means such as a primary turbine 20, a compressing means such as a primary compressor 22, means for exchanging heat energy with a secondary circuit 24 such as a heat exchanger 26, and primary conduits 28 connecting the components in the manner shown to form what is commonly referred to as a Brayton cycle. Also shown in FIG. 1, and plotted in FIG. 2, are pressure and temperature state values for an arrangement in accordance with the invention.

In the secondary circuit 24 a working fluid, which may be the same as or different from the coolant gas, is circulated through the heat exchange means, heat exchanger 26, to receive heat energy transferred from the primary system coolant. The secondary circuit 24, which also forms a Brayton cycle, includes expansion means such as a power turbine 30, means for cooling the working fluid such as a secondary precooler 32, compressing means such as a secondary compressor 34, and secondary conduits 36 connecting the components as shown.

Figure 2:
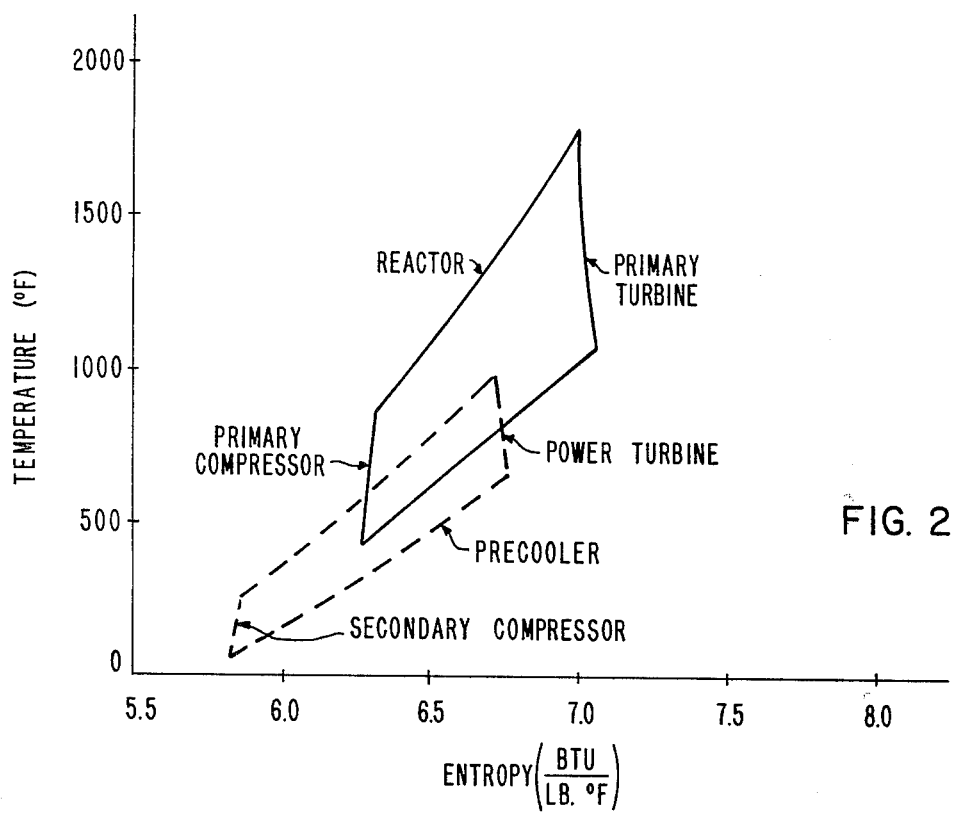
FIG. 2 is a temperature (°F)-entropy (B+u/lb·°F) plot of the system of FIG. 1.

As shown from FIGS. 1 and 2, in the exemplary system helium exits the reactor at approximately 1800° F. and 1489 psia. In a typical prior art design utilizing a heat exchanger to transfer energy to a power conversion system, helium at these high temperature, high pressure conditions enters the heat exchanger common to both circuits. In the disclosed arrangement, however, the coolant gas is initially passed through the turbine 20 from which work is extracted not only to drive the primary system compressor, but also to drive the secondary Brayton system compressor. Accordingly, the coolant exits the turbine 20 at less energetic conditions, 1072° F. and 496 psia in the exemplary arrangement. This temperature and pressure state substantially reduces the design concerns associated with the heat exchanger 26 while providing a good overall system efficiency which, in the exemplary system is approximately 0.36.

The extraction of work from the primary turbine 20 can be performed in several manners, including conversion to electricity to drive a motor which drives the compressor, although a direct in-line mechanical connection between the turbine and compressor shafts is preferred. Driving the secondary compressor 34 by the primary turbine 20 increases the proportion of the primary system 18 pressure drop taken by the turbine 20, and therefore desirably decreases the peak coolant temperatures entering the heat exchanger 26. The primary coolant gas exiting the heat exchanger 26 is recompressed in compressor 22 by an amount approximately equal to the primary system 18 pressure losses including the turbine 20 pressure drop, and is then directed back to the reactor core 12.

With the arrangement disclosed, the power turbine 30 can be located remotely at the load or wherever desired for the specific application. It can be used as a mechanical drive in a mobile application or, more commonly, coupled to a generator 38 for generation of electricity.

As apparent from FIG. 1, the disclosed arrangement further provides for enclosure of selected components within a containment structure 40 of reasonable size, while requiring only conduits 36' transporting a relatively low pressure, low temperature working fluid to penetrate the containment 40. Accordingly, the conduits 36' can be of smaller cross section and sealed containment penetrations 42 can be more simply and reliably incorporated.

Figure 4:
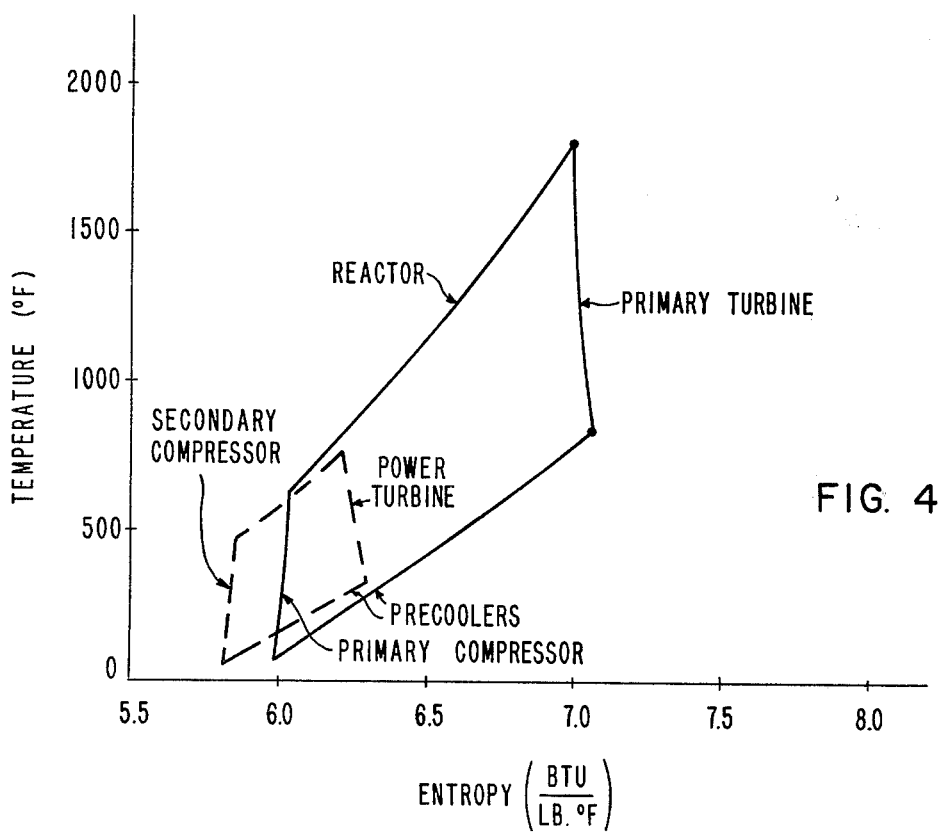
FIG. 4 is a temperature-entropy plot of the system of FIG. 3.
Figure 3:
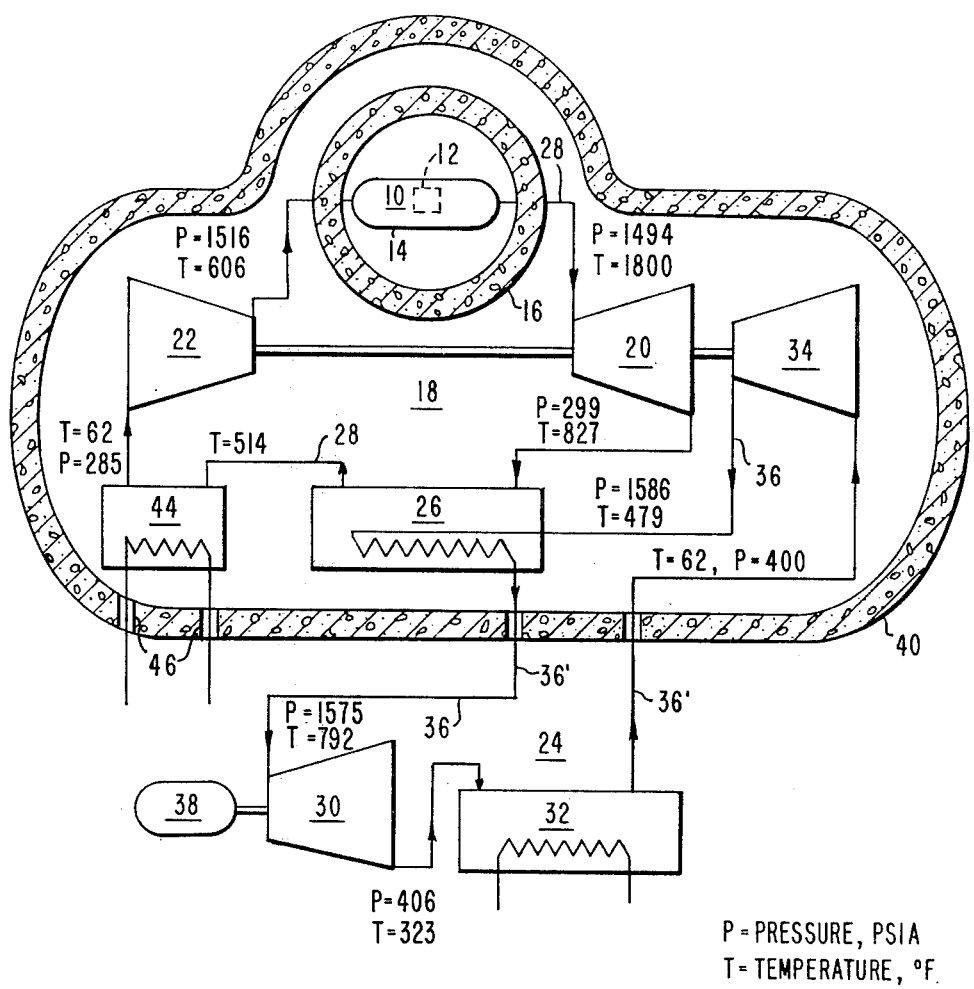
FIG. 3 is a schematic representation of another high temperature gas-cooled nuclear reactor system arrangement in accordance with this invention.

FIG. 3 and corresponding FIG. 4 show one of many modifications that can be made to the disclosed arrangements discussed above as desired for a given application. Here a primary precooler 44 has been added to the primary circuit such that the coolant gas flows from the heat exchanger 26 to the precooler 44 prior to entry into the primary compressor 22. This arrangement reduces the amount of energy required by the primary compressor 22, and utilizes more of the primary turbine 20 power to compress the secondary working fluid. The approach temperature differential between the two fluids entering the heat exchanger 26 is also substantially reduced. The net result is an increase in the overall plant efficiency, but requires, in addition to the primary precooler 44 disposed within the containment 40, additional penetrations 46 through the containment wall. The overall efficiency of this system is approximately 0.39.

It will be apparent to those skilled in the art of high temperature gas-cooled nuclear power plant design that the advantages resulting from the disclosed arrangements are substantial. Reducing the severe thermal conditions typically imposed upon the heat exchange means between the two circuits alleviates many material, design and cost concerns. Similarly, inclusion of the secondary circuit compressor within the containment structure while locating the other secondary components externally allows for a smaller containment with less stringent penetration design requirements. And, utilization of two Brayton-type thermal cycles in heat exchange relationship provides a most efficient means for utilizing the capabilities of a high temperature gas-cooled reactor.

It will be further apparent that many modifications and additions are possible in view of the above teachings. It therefore is to be understood that within the scope of the appended claims the invention can be practiced other than as specifically described.

I claim:

1. Apparatus for generating power from a high temperature nuclear reactor circulating a gas coolant, said apparatus comprising:
   a. a primary Brayton-type circuit including means for serially circulating said gas coolant through said reactor, a primary turbine, primary heat exchanger, a primary compressor and back to said reactor;
   b. a secondary Brayton-type circuit including means for serially circulating a working fluid through said primary heat exchanger in heat exchange relation with said gas coolant, a secondary turbine, secondary pre-cooling means, a secondary compressor and back to said heat exchange means; and
   c. means for extracting work from said primary turbine to drive said primary and secondary compressors comprising a mechanical connection among said primary turbine, primary compressor and secondary compressor
   d. a sealed containment structure wherein said reactor, said primary turbine, said primary and secondary compressors, and said primary heat exchanger are disposed within said containment and wherein said secondary turbine and said secondary precooling means are disposed externally of said containment.

2. A method of generating power from a high temperature nuclear reactor circulating a gas coolant, said method comprising:
   a. serially circulating said gas coolant through a primary Brayton-type circuit including said reactor, a primary turbine, primary heat exchanger, a primary compressor and back to said reactor;

b. serially circulating a working fluid through a secondary Brayton-type circuit including said primary heat exchanger in heat exchange relation with said gas coolant, a secondary turbine, precooling means, a secondary compressor and back to said heat exchange means; and
c. extracting work from said primary turbine to drive said primary and secondary compressors through a mechanical connection among said primary turbine, primary compressor and secondary compressor
d. enclosing within a sealed containment structure said reactor, primary turbine, primary and secondary compressors, and said primary heat exchange.

* * * * *